(12) United States Patent
Kanemaki et al.

(10) Patent No.: US 9,888,323 B2
(45) Date of Patent: *Feb. 6, 2018

(54) ELECTRONIC APPARATUS

(71) Applicant: KYOCERA Corporation, Kyoto-shi, Kyoto (JP)

(72) Inventors: Yasuhito Kanemaki, Katano (JP); Masahiko Hirose, Amagasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,247

(22) Filed: Jan. 22, 2016

(65) Prior Publication Data

US 2016/0142827 A1  May 19, 2016

Related U.S. Application Data

(63) Continuation of application No. PCT/JP2014/067193, filed on Jun. 27, 2014.

(30) Foreign Application Priority Data

Jul. 29, 2013 (JP) .................................. 2013-157094

(51) Int. Cl.
*H04R 17/00* (2006.01)
*H04R 1/02* (2006.01)
(Continued)

(52) U.S. Cl.
CPC ............. *H04R 17/00* (2013.01); *H04M 1/03* (2013.01); *H04R 1/025* (2013.01); *H04R 7/04* (2013.01);
(Continued)

(58) Field of Classification Search
CPC .......... H04R 1/025; H04R 7/04; H04R 7/045; H04R 17/00; H04R 17/005; H04R 17/10;
(Continued)

(56) References Cited

U.S. PATENT DOCUMENTS 4,352,961 A * 10/1982 Kumada ................. H04R 17/10
310/321
5,115,472 A * 5/1992 Park ........................ H04R 1/028
310/324
(Continued)

FOREIGN PATENT DOCUMENTS

JP   2000-152385 A   5/2000
JP   2003-271074 A   9/2003
(Continued)

OTHER PUBLICATIONS

International Search Report and Written Opinion of the International Searching Authority issued by the Japanese Patent Office for International Application No. PCT/JP2014/067193.

*Primary Examiner* — Joshua Kaufman
(74) *Attorney, Agent, or Firm* — Procopio Cory Hargreaves and Savitch LLP

(57) ABSTRACT

An electronic apparatus comprises: an exterior exposed to the outside; a piezoelectric vibrating element being transparent and being located inside the exterior; a vibration unit being transparent and including a surface on which the piezoelectric vibrating element is located, the vibration unit being configured to vibrate by the piezoelectric vibrating element to generate a voice; and a display located inside the exterior and overlapping the piezoelectric vibrating element in a plan view.

9 Claims, 10 Drawing Sheets

(51) Int. Cl.
*H04M 1/03* (2006.01)
*H04R 7/04* (2006.01)

(52) U.S. Cl.
CPC ...... *H04R 2499/11* (2013.01); *H04R 2499/15* (2013.01)

(58) Field of Classification Search
CPC ............ H04R 2400/03; H04R 2440/01; H04R 2499/11; H04R 2499/15; H04M 1/026; H04M 1/0266
See application file for complete search history.

(56) References Cited

U.S. PATENT DOCUMENTS

| | | | | |
|---|---|---|---|---|
| 5,638,456 | A * | 6/1997 | Conley | G06F 1/1616 181/141 |
| 5,828,768 | A * | 10/1998 | Eatwell | G06F 1/1616 381/110 |
| 6,427,017 | B1 * | 7/2002 | Toki | B06B 1/0688 181/170 |
| 6,795,561 | B1 * | 9/2004 | Bank | H04R 7/045 381/152 |
| 7,149,318 | B2 * | 12/2006 | Bank | H04R 1/028 381/152 |
| 7,151,837 | B2 * | 12/2006 | Bank | H04R 7/045 381/152 |
| 7,657,042 | B2 * | 2/2010 | Miyata | G02F 1/133 381/152 |
| 7,764,803 | B2 * | 7/2010 | Kang | H04R 7/04 381/152 |
| 8,884,897 | B2 * | 11/2014 | Sashida | G06F 3/016 178/18.04 |
| 8,934,228 | B2 * | 1/2015 | Franklin | G06F 1/1652 361/679.26 |
| 9,131,300 | B2 * | 9/2015 | Horii | H04M 1/026 |
| 9,332,098 | B2 * | 5/2016 | Horii | H04M 1/035 |
| 9,350,832 | B2 * | 5/2016 | Horii | H04M 1/03 |
| 2003/0053643 | A1 * | 3/2003 | Bank | H04R 1/028 381/152 |
| 2005/0025330 | A1 * | 2/2005 | Saiki | H04R 7/04 381/388 |
| 2006/0099996 | A1 * | 5/2006 | Kanai | H04M 1/03 455/566 |
| 2009/0045700 | A1 * | 2/2009 | Sasaki | B06B 1/0603 310/348 |
| 2009/0236941 | A1 * | 9/2009 | Nakai | H03H 9/0561 310/340 |
| 2010/0117809 | A1 * | 5/2010 | Dai | G06F 3/041 340/407.2 |
| 2010/0201652 | A1 * | 8/2010 | Caliskan | G06F 3/016 345/177 |
| 2011/0102355 | A1 * | 5/2011 | Aono | G06F 3/016 345/173 |
| 2011/0102358 | A1 * | 5/2011 | Aono | G06F 3/016 345/173 |
| 2011/0169765 | A1 * | 7/2011 | Aono | G06F 3/016 345/173 |
| 2011/0181538 | A1 * | 7/2011 | Aono | G06F 3/016 345/173 |
| 2011/0181539 | A1 * | 7/2011 | Aono | G06F 3/0414 345/173 |
| 2011/0242055 | A1 * | 10/2011 | Kim | G06F 3/042 345/175 |
| 2011/0260991 | A1 * | 10/2011 | Aono | G06F 3/016 345/173 |
| 2012/0038580 | A1 * | 2/2012 | Sasaki | G06F 3/016 345/173 |
| 2012/0126961 | A1 * | 5/2012 | Aono | G06F 3/016 340/407.2 |
| 2012/0133496 | A1 * | 5/2012 | Aono | G06F 3/016 340/407.2 |
| 2012/0154316 | A1 * | 6/2012 | Kono | G06F 3/016 345/173 |
| 2012/0154328 | A1 * | 6/2012 | Kono | G06F 3/016 345/174 |
| 2012/0154329 | A1 * | 6/2012 | Shinozaki | G06F 3/016 345/174 |
| 2012/0243719 | A1 * | 9/2012 | Franklin | G06F 1/1652 381/333 |
| 2012/0270605 | A1 * | 10/2012 | Garrone | H04M 1/72563 455/566 |
| 2015/0005036 | A1 * | 1/2015 | Horii | H04M 1/0266 455/566 |
| 2015/0104047 | A1 * | 4/2015 | Izumi | H04M 1/03 381/162 |
| 2015/0141088 | A1 * | 5/2015 | Hosoi | H04M 1/035 455/575.1 |
| 2015/0326967 | A1 * | 11/2015 | Otani | H04R 1/028 381/114 |
| 2016/0100255 | A1 * | 4/2016 | Kanemaki | H04R 17/00 381/190 |

FOREIGN PATENT DOCUMENTS

| | | |
|---|---|---|
| JP | 2004-200729 A | 7/2004 |
| JP | 2006-135858 A | 5/2006 |
| JP | 2013-131987 A | 7/2013 |

\* cited by examiner

F I G . 1
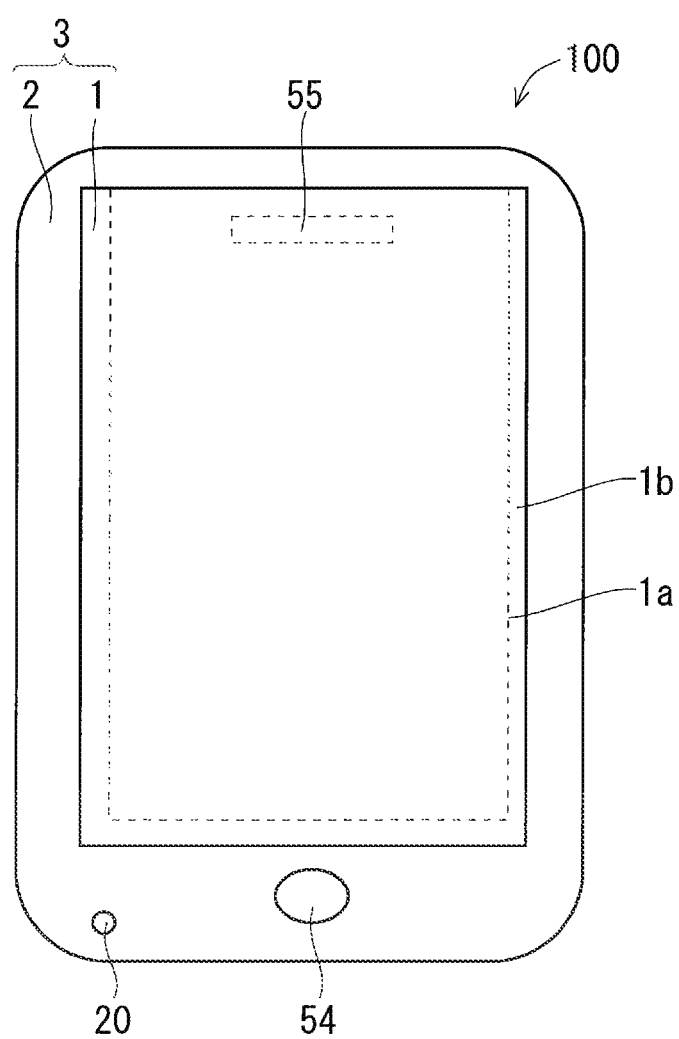

F I G . 3
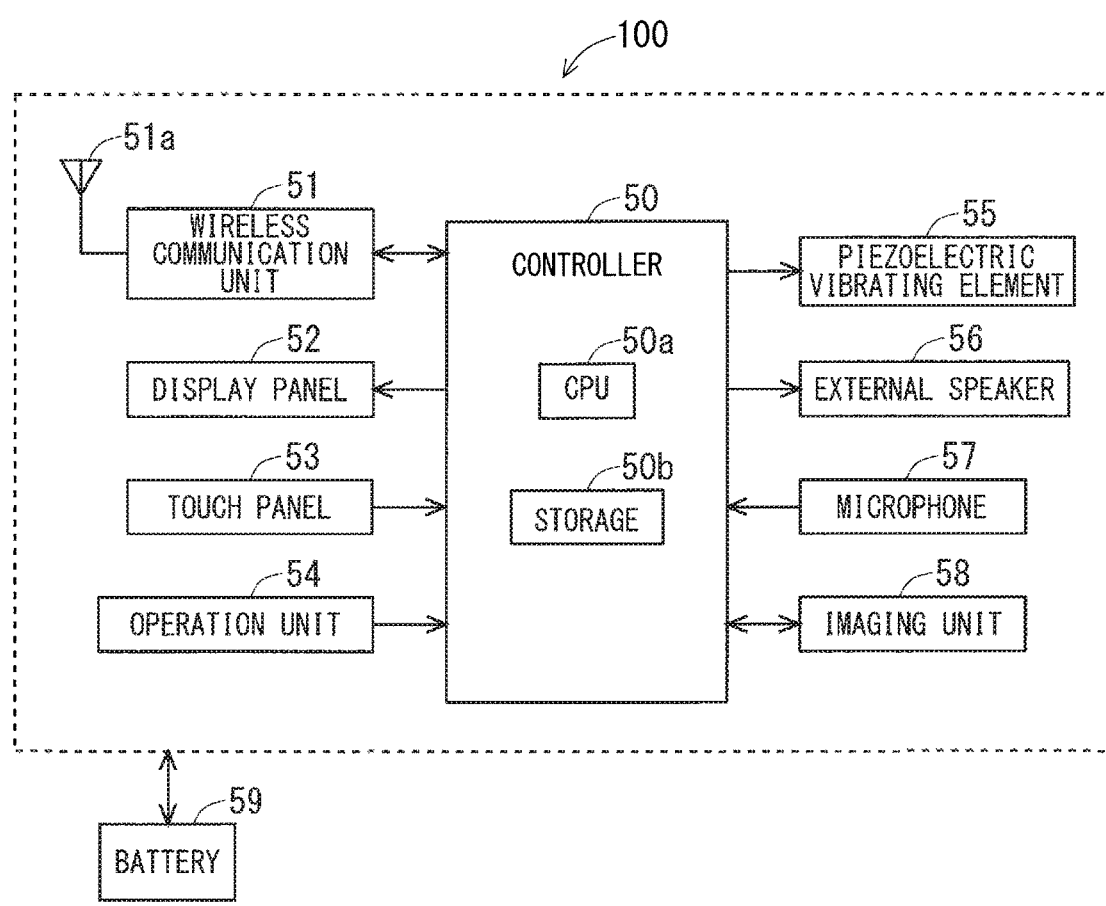

F I G . 4
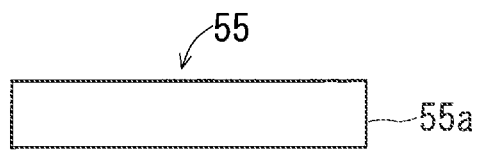
F I G . 5
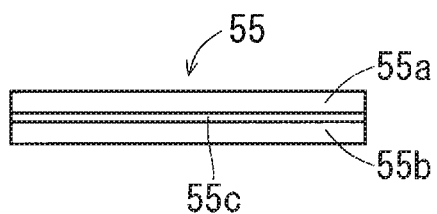
F I G . 6
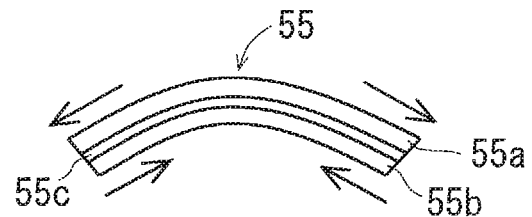
F I G . 7
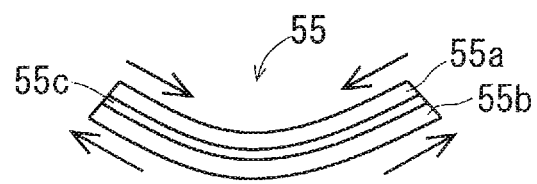

F I G . 9
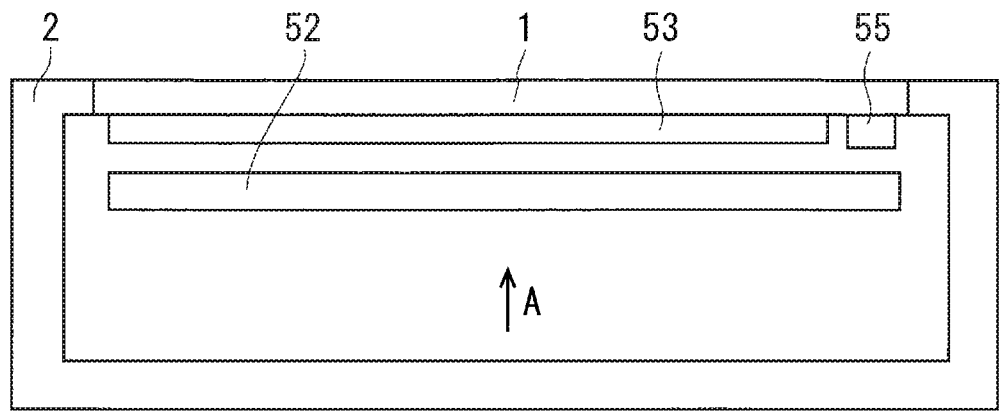
F I G . 1 0
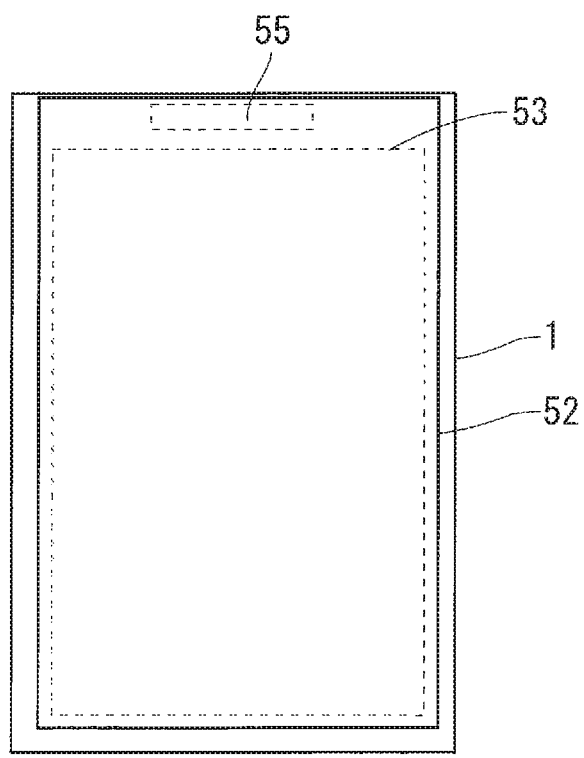

F I G. 1 5
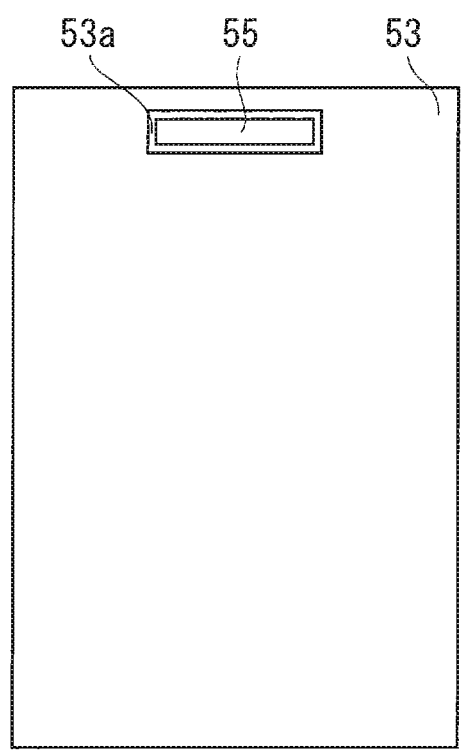

F I G . 1 6
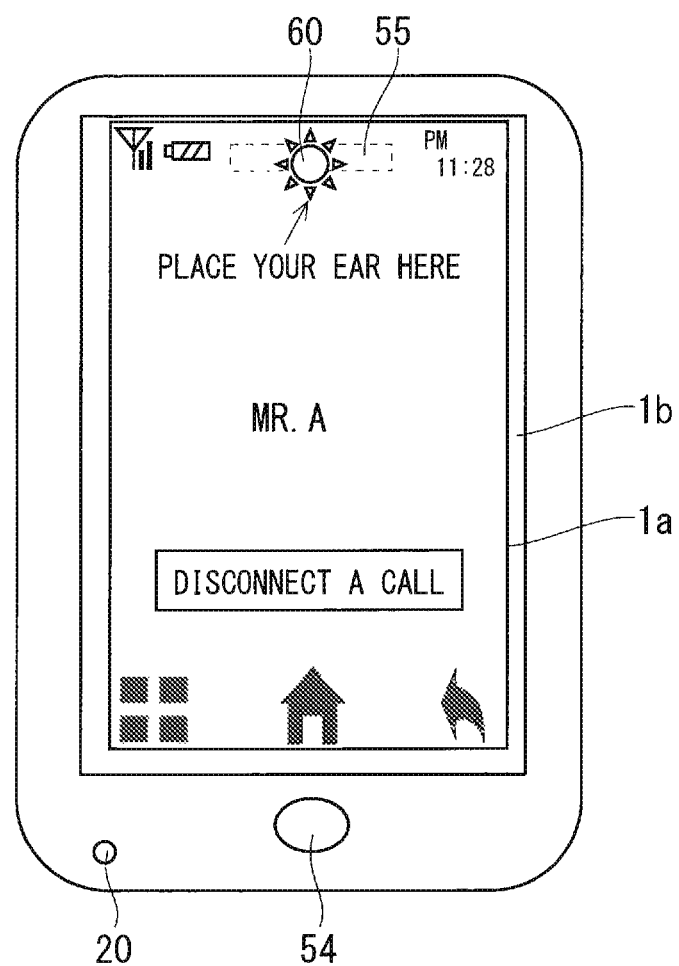

US 9,888,323 B2

ELECTRONIC APPARATUS

CROSS-REFERENCE TO RELATED APPLICATION

The present application is a continuation based on PCT Application No. PCT/JP2014/067193 filed on Jun. 27, 2014, which claims the benefit of Japanese Application No. 2013-157094, filed on Jul. 29, 2013. PCT Application No. PCT/JP2014/067193 and Japanese Application No. 2013-157094 are entitled "ELECTRONIC APPARATUS". The contents of which are incorporated by reference herein in their entirety.

FIELD

Embodiments of the present disclosure relate to an electronic apparatus transmitting a sound to a user.

BACKGROUND ART

Various technologies have conventionally been proposed for electronic apparatuses. For example, a technology for transmitting a sound to a user of a phone such as a mobile phone and a fixed phone by mounting a piezoelectric vibrating element on a cover panel of the phone and vibrating the piezoelectric vibrating element has been proposed.

SUMMARY

An electronic apparatus is disclosed. In one embodiment, an electronic apparatus comprises: an exterior exposed to the outside; a piezoelectric vibrating element being transparent and being located inside the exterior; a vibration unit being transparent and including a surface on which the piezoelectric vibrating element is located, said vibration unit being configured to vibrate by the piezoelectric vibrating element to generate a voice; and a display located on the inner side than the piezoelectric vibrating element inside the exterior and located so as to overlap the piezoelectric vibrating element in a plan view.

BRIEF DESCRIPTION OF DRAWINGS

FIG. 1 illustrates a front view showing an external appearance of an electronic apparatus.

FIG. 3 illustrates a block diagram showing an electrical configuration of the electronic apparatus.

FIG. 4 illustrates a plan view showing a piezoelectric vibrating element.

FIG. 5 illustrates a side view showing the piezoelectric vibrating element.

FIG. 6 illustrates how the piezoelectric vibrating element is bent.

FIG. 7 illustrates how the piezoelectric vibrating element is bent.

FIG. 9 illustrates a cross-sectional view of the electronic apparatus.

FIG. 10 illustrates a view showing a cover panel, a display panel, a touch panel, and the piezoelectric vibrating element in a plan view when seen from a direction A.

FIG. 15 illustrates a view showing the touch panel and the piezoelectric vibrating element of the electronic apparatus in a plan view when seen from a direction B.

FIG. 16 illustrates a view showing a screen of the electronic apparatus during a phone call.

DETAILED DESCRIPTION

<External Appearance of Electronic Apparatus>

Figure 2:
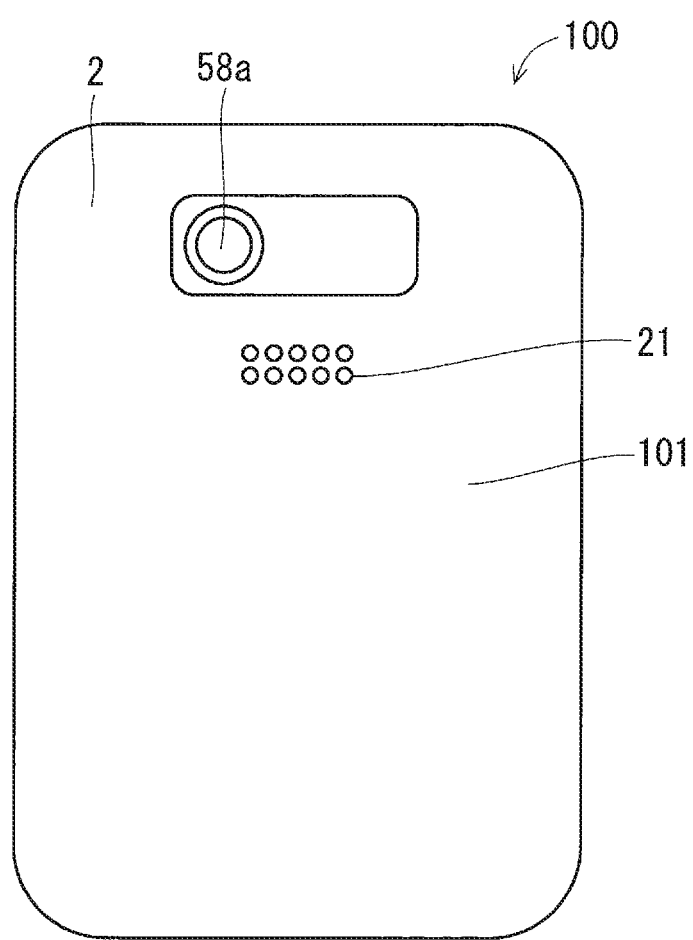
FIG. 2 illustrates a rear view showing an external appearance of the electronic apparatus.

A electronic apparatus 100 according to one embodiment illustrated in the diagrams comprises a mobile phone, for example.

As illustrated in FIG. 1, the electronic apparatus 100 includes a cover panel 1 serving as a vibration unit and a case portion 2 serving as an exterior. A combination of the cover panel 1 and the case portion 2 forms an apparatus case 3 having a substantially rectangular plate shape in a plan view.

The cover panel 1 has a substantially rectangular shape in a plan view. The cover panel 1 forms a front portion of the electronic apparatus 100 except for a peripheral portion.

The cover panel 1 is transparent and is made of, for example, glass, acrylic resin, and sapphire crystals. The transparency herein is referred to as a transmittance of 70% to 100% to visible light. The sapphire crystals are referred to as aluminum oxide ($AlO_3$) crystals that are industrially manufactured.

The case portion 2 forms a peripheral front portion, a side portion, and a rear portion of the electronic apparatus 100. The case portion 2 is made of, for example, resin. For example, polycarbonate resin, ABS resin, or nylon-based resin is used for the resin forming the case portion 2. The case portion 2 may be formed of one member alone and may be formed of a combination of a plurality of members.

The cover panel 1 includes a display portion 1a displaying various pieces of information such as characters, symbols, and figures. The display portion 1a has, for example, a rectangular shape in a plan view. A peripheral portion 1b that surrounds the display portion 1a is opaque and/or not transparent because of, for example, a film or the like that is attached thereto. Accordingly, the peripheral portion 1b is a non-display portion that does not display information. A touch panel 53 described below is attached to an inner main surface of the cover panel 1. The user can provide various instructions to the electronic apparatus 100 by operating the display portion 1a of the cover panel 1 using the finger or the like.

An operation unit 54 including an operation button is provided inside the apparatus case 3. The operation button is a so-called hard key. The surface of the operation button is exposed from a lower end of a front surface of the apparatus case 3. In one embodiment, the surface of the operation button is exposed from the surface of the case portion 2 and may be exposed from a lower end of an outer main surface of the cover panel 1. The electronic apparatus 100 may include a plurality of operation units 54.

As illustrated in FIG. 1, a piezoelectric vibrating element 55 described below is provided inside the apparatus case 3. As illustrated in FIG. 1, the apparatus case 3 has a microphone hole 20. As illustrated in FIG. 2, a rear surface 101 of the electronic apparatus 100, namely, a rear surface of the apparatus case 3 has speaker holes 21. An imaging lens 58a included in an imaging unit 58 described below is exposed from the rear surface 101 of the electronic apparatus 100.

In the example of FIG. 2, the speaker holes 21 are provided for outputting a sound of a speaker to the outside, and when a film speaker or the like including a piezoelectric vibration element is used as a speaker of the electronic apparatus 100, the speaker holes 21 may not be provided.

In the example of FIG. 1, the microphone hole 20 is provided for collecting a sound to a microphone, and when the sound can be converted into an electrical signal in the microphone without a hole, the microphone hole 21 does not need to be provided.

<Electrical Configuration of Electronic Apparatus>

FIG. 3 illustrates a block diagram showing an electrical configuration of the electronic apparatus 100. As illustrated in FIG. 3, the electronic apparatus 100 includes a controller 50, a wireless communication unit 51, a display panel 52 serving as a display, the touch panel 53 serving as an approach detecting unit, the operation unit 54, the piezoelectric vibrating element 55, an external speaker 56, a microphone 57, the imaging unit 58, and a battery 59. These elements are housed in the apparatus case 3.

The controller 50 includes a CPU 50a and a storage 50b. The controller 50 can manage the overall operation of the electronic apparatus 100 by controlling other elements of the electronic apparatus 100. The storage 50b is formed of ROM and RAM. Various functional blocks are formed in the controller 50 by the CPU 50a executing various programs in the storage 50b.

In the wireless communication unit 51, an antenna 51a can receive a signal from a mobile phone different from the electronic apparatus 100, or from a communication device such as a web server connected to the Internet via a base station. The wireless communication unit 51 can perform an amplification process and down conversion on the received signal and outputs the signal to the controller 50. The controller 50 can perform demodulation processing or the like on the input signal, and acquires a sound signal indicating a voice or music included in the received signal. Further, the wireless communication unit 51 can perform up conversion and the amplification process on a transmission signal including the sound signal or the like generated in the controller 50, and can wirelessly transmit the transmission signal after the process from the antenna 51a. The transmission signal from the antenna 51a can be received in the mobile phone different from the electronic apparatus 100 or the communication device connected to the Internet via the base station.

The display panel 52 serving as a display is, for example, a liquid crystal display panel or an organic electro luminescent (EL) panel. The display panel 52 can display various pieces of information such as characters, symbols, and figures by control of the controller 50. The information displayed on the display panel 52 can be visually recognized by the user of the electronic apparatus 100 through the display portion 1a of the cover panel 1.

The touch panel 53 serving as the approach detecting unit is, for example, a projection type electrostatic capacitance touch panel. The touch panel 53 can detect an operation of the display portion 1a of the cover panel 1 by the user. The touch panel 53 is attached to the inner main surface of the cover panel 1. The touch panel 53 includes two sheet-shaped electrode sensors opposed to each other. The two electrode sensors are bonded to each other through a transparent adhesive sheet.

Formed in one of the electrode sensors are a plurality of long and narrow X electrodes that extend along an X-axis direction (for example, horizontal direction of the electronic apparatus 100) and are disposed parallel to one another. Formed on the other electrode sensor are a plurality of long and narrow Y electrodes that extend along a Y-axis direction (for example, vertical direction of the electronic apparatus 100) and are disposed parallel to one another. When the finger or the like of the user contacts the display portion 1a of the cover panel 1, an electrostatic capacitance between the X electrode and the Y electrode below the contact portion changes, and the touch panel 53 can thus detect an operation of the display portion 1a of the cover panel 1. The change in the electrostatic capacitance between the X electrode and the Y electrode generated in the touch panel 53 is transmitted to the controller 50, and the controller 50 can specify the details of the operation performed on the display portion 1a of the cover panel 1 based on the change in the electrostatic capacitance and perform an operation according to the specified details.

In one embodiment, the approach detecting unit comprises the touch panel, which is not limited thereto. For example, the approach detecting unit is not limited to an example that detects a contact such as a touch panel and also includes an example that detects an approach without a contact. The example that detects an approach without a contact comprises, for example, a proximity sensor. In addition, the approach detecting unit may comprise an electrostatic capacitance approach detecting unit capable of detecting a change in an electrostatic capacitance more sensitively than the electrostatic capacitance touch panel.

When the user presses the operation button, the operation unit 54 can output, to the controller 50, an operation signal indicating that the operation button has been pressed. The controller 50 can identify, based on an operation signal to be input, which operation button has been operated, and can perform the operation according to the operation button that has been operated.

The piezoelectric vibrating element 55 can transmit a reception sound to the user of the electronic apparatus 100. The piezoelectric vibrating element 55 is vibrated by a drive voltage provided from the controller 50. The controller 50 can generate a drive voltage based on a sound signal indicating a reception sound and provide the drive voltage to the piezoelectric vibrating element 55. The piezoelectric vibrating element 55 is vibrated by the controller 50 based on the sound signal indicating the reception sound, and the reception sound is transmitted to the user of the electronic apparatus 100. In this manner, the controller 50 functions as a drive unit configured to vibrate the piezoelectric vibrating element 55 based on a sound signal. The piezoelectric vibrating element 55 will be described below in detail.

The external speaker 56 can convert the electric sound signal from the controller 50 into a sound and then output the sound. The sound output from the external speaker 56 is output to the outside from the speaker holes 21 provided in the rear surface 101 of the electronic apparatus 100.

The microphone 57 can output a sound from the outside of the electronic apparatus 100 to the controller 50 by converting the sound into an electric sound signal. The sound from the outside of the electronic apparatus 100 is received by the microphone 57 through the microphone hole 20 configured in the front surface of the electronic apparatus 100.

The imaging unit 58 includes the imaging lens 58*a*, an imaging element, and the like, and the imaging unit 58 can image a still image and a moving image based on the control by the controller 50.

The battery 59 can output the power for the electronic apparatus 100. The power output from the battery 59 is supplied to the respective electronic components such as the controller 50 and the wireless communication unit 51 of the electronic apparatus 100.

<Details of Piezoelectric Vibrating Element>

FIGS. 4 and 5 are a top view and a side view, respectively, illustrating a structure of the piezoelectric vibrating element 55. As illustrated in FIGS. 4 and 5, the piezoelectric vibrating element 55 has a long shape in one direction. Specifically, the piezoelectric vibrating element 55 has a long and narrow rectangular plate shape in a plan view.

The piezoelectric vibrating element 55 has a thickness of 0.5 to 0.8 mm. The piezoelectric vibrating element 55 has a length of a long side of 10 to 20 mm and a length of a short side of 2 to 5 mm in a plan view.

The piezoelectric vibrating element 55 has, for example, a bimorph structure and includes a first piezoelectric plate 55*a* and a second piezoelectric plate 55*b* which are bonded to each other through a shim material 55*c*.

In the piezoelectric vibrating element 55, when a positive voltage is applied to the first piezoelectric plate 55*a* and a negative voltage is applied to the second piezoelectric plate 55*b*, the first piezoelectric plate 55*a* extends along the longitudinal direction and the second piezoelectric plate 55*b* contracts along the longitudinal direction. Accordingly, as illustrated in FIG. 6, the piezoelectric vibrating element 55 is bent into a convex shape with the first piezoelectric plate 55*a* being outside.

In contrast, in the piezoelectric vibrating element 55, when a negative voltage is applied to the first piezoelectric plate 55*a* and a positive voltage is applied to the second piezoelectric plate 55*b*, the first piezoelectric plate 55*a* contracts along the longitudinal direction and the second piezoelectric plate 55*b* extends along the longitudinal direction. Accordingly, as illustrated in FIG. 7, the piezoelectric vibrating element 55 is bent into a convex shape with the second piezoelectric plate 55*b* being outside.

The piezoelectric vibrating element 55 vibrates while being bent by alternately taking the state of FIG. 6 and the state of FIG. 7. The controller 50 allows the piezoelectric vibrating element 55 to vibrate while being bent by applying an alternating current voltage in which the positive voltage and the negative voltage alternately appear at an area between the first piezoelectric plate 55*a* and the second piezoelectric plate 55*b*.

Only one structure made of the first piezoelectric plate 55*a* and the second piezoelectric plate 55*b*, which are bonded to each other with the shim material 55*c* therebetween, is provided in the piezoelectric vibrating element 55 illustrated in FIGS. 5 to 7. Alternatively, a plurality of the structures may be laminated to each other.

<Generation of Reception Sound by Vibration of Piezoelectric Vibrating Element>

In one embodiment, the piezoelectric vibrating element 55 causes the cover panel 1 to vibrate, so that the air conduction sound and the tissue conduction sound (vibration sound) are transmitted from the cover panel 1 to the user. In other words, a vibration of the piezoelectric vibrating element 55 itself is transmitted to a vibration unit of the cover panel 1 or the like, so that the air conduction sound and the tissue conduction sound are transmitted from the cover panel 1 to the user.

Here, the term "air conduction sound" means a sound recognized in the human brain by the vibration of an eardrum due to a sound wave (air vibration) which enters an external auditory meatus hole (a so-called "ear hole"). On the other hand, the term "tissue conduction sound" means a sound recognized in the human brain by the vibration of the eardrum due to the vibration of an auricle transmitted to the eardrum. Hereinafter, the air conduction sound and the tissue conduction sound will be described in detail.

Figure 8:
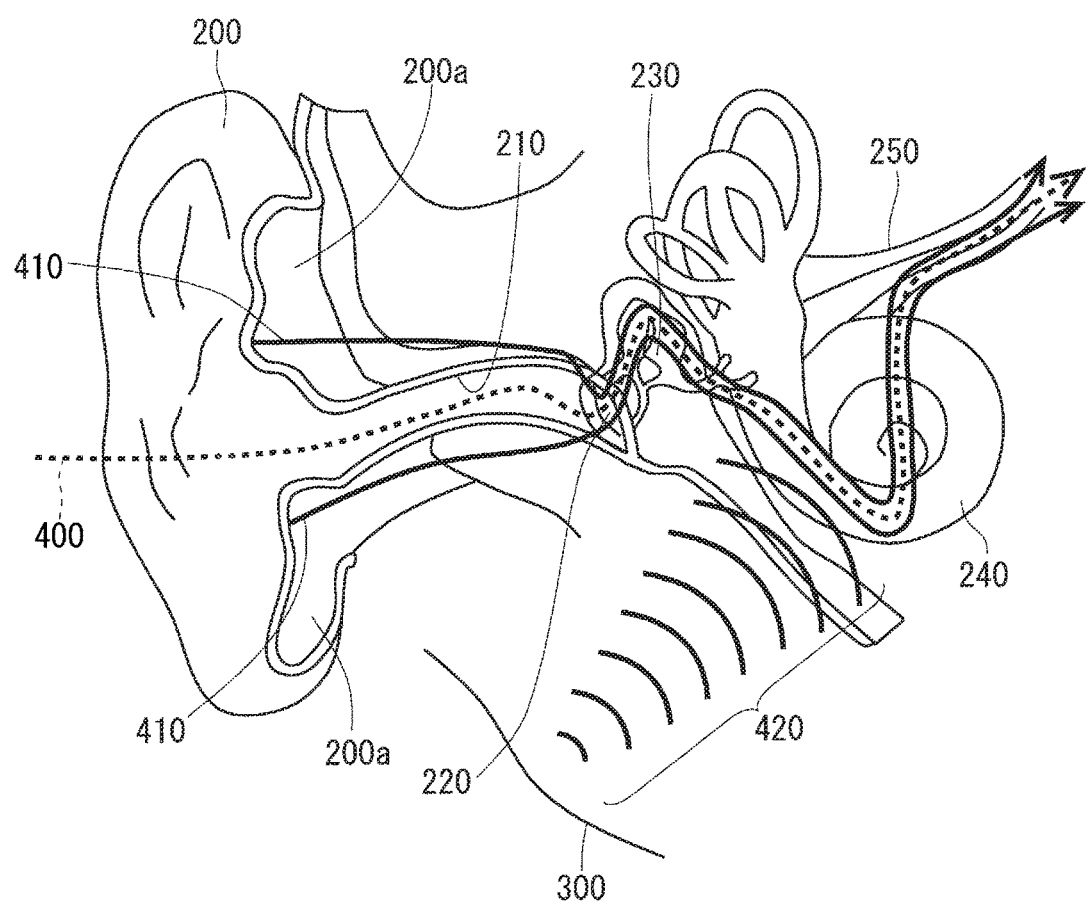
FIG. 8 illustrates a view for describing air conduction sound and tissue conduction sound.

FIG. 8 illustrates a view for describing the air conduction sound and the tissue conduction sound. FIG. 8 illustrates the structure of the ear of the user of the electronic apparatus 100. In FIG. 8, a dotted line 400 indicates a conduction path of a sound signal (sound information) of the air conduction sound when recognized in the brain, and a solid line 410 indicates a conduction path of a sound signal of the tissue conduction sound when recognized in the brain.

When the piezoelectric vibrating element 55 mounted on the cover panel 1 vibrates based on the electric sound signal indicating the reception sound, the cover panel 1 vibrates, and a sound wave is output from the cover panel 1. When the user moves the cover panel 1 of the electronic apparatus 100 close to an auricle 200 of the user by holding the electronic apparatus 100 in a hand, or the cover panel 1 of the electronic apparatus 100 is set to the auricle 200 of the user, the sound wave output from the cover panel 1 enters an external auditory meatus hole 210. The sound wave from the cover panel 1 travels through the external auditory meatus hole 210 and causes an eardrum 220 to vibrate. The vibration of the eardrum 220 is transmitted to an auditory ossicle 230 and the auditory ossicle 230 vibrates. In addition, the vibration of the auditory ossicle 230 is transmitted to a cochlea 240 and is converted into an electrical signal in the cochlea 240. The electrical signal is transmitted to the brain by passing through an acoustic nerve 250 and the reception sound is recognized in the brain. In this manner, the air conduction sound is transmitted from the cover panel 1 to the user.

Further, when the user puts the cover panel 1 of the electronic apparatus 100 to the auricle 200 of the user by holding the electronic apparatus 100 in a hand, the auricle 200 is vibrated by the cover panel 1, which is vibrated by the piezoelectric vibrating element 55. The vibration of the auricle 200 is transmitted to the eardrum 220, and thus the eardrum 220 vibrates. The vibration of the eardrum 220 is transmitted to the auditory ossicle 230, and thus the auditory ossicle 230 vibrates. The vibration of the auditory ossicle 230 is transmitted to the cochlea 240 and is converted into an electrical signal in the cochlea 240. The electrical signal is transmitted to the brain by passing through the acoustic nerve 250 and the reception sound is recognized in the brain. In this manner, the tissue conduction sound (vibration sound) is transmitted from the cover panel 1 to the user. FIG. 8 also illustrates an auricle cartilage 200*a* in the inside of the auricle 200.

Bone conduction sound (also referred to as "bone conducted sound") is a sound recognized in the human brain by the vibration of the skull and direct stimulation of the inner ear such as the cochlea caused by the vibration of the skull. In FIG. 8, in a case where a jawbone 300 is vibrated, the transmission path of the sound signal while the bone conducted sound is recognized in the brain is indicated with a plurality of arcs 420.

As described above, in the electronic apparatus 100 according to one embodiment, the air conduction sound and the tissue conduction sound can be transmitted from the cover panel 1 to the user of the electronic apparatus 100 due to an appropriate vibration of the cover panel 1 being the front surface through the vibration of the piezoelectric vibrating element 55, that is to say, due to the vibration of the piezoelectric vibrating element 55 itself appropriately transmitted to the cover panel 1 being the front surface. The structure of the piezoelectric vibrating element 55 according to one embodiment is contrived to appropriately transmit the air conduction sound and the tissue conduction sound to the user. Various advantages are achieved by configuring the electronic apparatus 100 to transmit the air conduction sound and the tissue conduction sound to the user.

If there is a large amount of ambient noise, the user can make it difficult to hear the ambient noise by strongly putting the cover panel 1 to the ear while turning up the volume of the tissue conduction sound. Accordingly, the user can appropriately perform communication even when there is a large amount of the ambient noise.

In addition, even with earplugs or earphones on his/her ears, the user can recognize the reception sound from the electronic apparatus 100 by putting the cover panel 1 to the ear (more specifically, the auricle). Further, even with headphones on his/her ears, the user can recognize the reception sound from the electronic apparatus 100 by putting the cover panel 1 to the headphones.

<Placement of Piezoelectric Vibrating Element>

FIG. 9 illustrates a sectional structure in the vertical direction (longitudinal direction) of the electronic apparatus 100. FIG. 10 illustrates a plan view showing the cover panel 1 serving as the vibration unit and the display panel 52 serving as the display when seen from the rear surface side of the cover panel 1 (plan view when seen from a direction A illustrated in FIG. 9). In addition, dotted portions indicate portions that are not actually seen. The touch panel 53 serving as the approach detecting unit is attached to the rear surface (inner main surface) of the cover panel 1 so as to face the display portion 1a (see FIG. 1) of the cover panel 1. The display panel 52 is disposed so as to face the cover panel 1 and the touch panel 53. A portion of the surface (outer main surface) of the cover panel 1 that overlaps the display panel 52 in a plan view is the display portion 1a (see FIGS. 1 and 2).

The piezoelectric vibrating element 55 is attached to the rear surface (inner main surface) of the cover panel 1 with a member such as a double-sided tape and an adhesive. In one embodiment, the piezoelectric vibrating element 55 is attached to an upper end of the rear surface of the cover panel 1.

In one embodiment, the piezoelectric vibrating element 55 is transparent. The transparency herein is referred to as a transmittance of 70% to 100% to visible light. The transparent piezoelectric vibrating element 55 is made of organic piezoelectric materials such as polyvinylidene difluoride and polylactic acid. Specifically, for example, polylactic acid films are used for the first piezoelectric plate 55a and the second piezoelectric plate 55b, and they are laminated together to form the piezoelectric vibrating element 55. In addition, a transparent electrode, for example, indium-tin-oxide (ITO), is used for electrodes.

The piezoelectric vibrating element 55 has conventionally been disposed so as not to overlap the display panel 52 in a plan view. The reason is that in a case where the piezoelectric vibrating element 55 is disposed so as to overlap the display panel 52, the piezoelectric vibrating element 55 obstructs display of an image or video output from the display panel 52.

Figure 11:
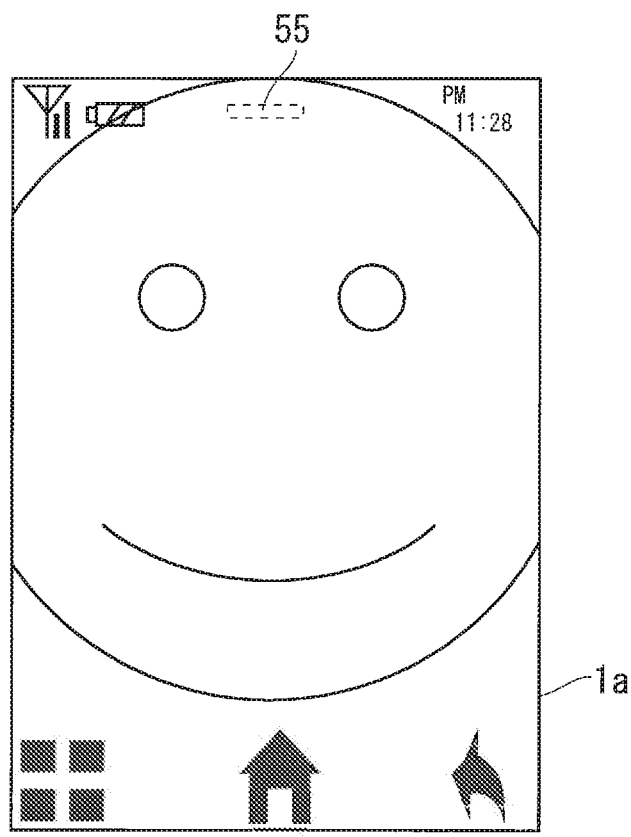
FIG. 11 illustrates a plan view showing a display screen of the electronic apparatus.

However, the transparent piezoelectric vibrating element 55 is used in one embodiment, so that the piezoelectric vibrating element 55 can be located so as to overlap the display panel 52 in the plan view when seen from the direction A, as illustrated in FIG. 10 (the piezoelectric vibrating element 55 and the touch panel 53, which are actually not seen from the direction A, are indicated by the dotted lines in FIG. 10). The reason is that the transparent piezoelectric vibrating element 55 can transmit display by the display panel 52. Thus, for example, a portion of the peripheral portion 1b of the cover panel 1 over the display portion 1a can have a reduced width, or the portion can be eliminated. Therefore, the display region can be more increased. Accordingly, as illustrated in FIG. 11, an image can be displayed in a region of the display portion 1a facing the piezoelectric vibrating element 55, and an image or video can thus be displayed on most of the screen. The example of FIG. 1 eliminates the portion of the peripheral portion 1b of the cover panel 1 over the display portion 1a.

The touch panel 53 may have a gap between the display panel 52 and the touch panel 53 and may contact the display panel 52. The gap provided between the touch panel 53 and the display panel 52 similarly to one embodiment can prevent a disturbance in display of the display panel 52 caused by the cover panel 1 contacting the display panel 52 (more accurately, caused by the touch panel contacting the display panel 52) even if the cover panel 1 is bent to the display panel 52 side by the user pressing the cover panel 1 with the finger or the like.

A printed circuit board (not illustrated) in which various components such as the CPU 50a and the microphone 57 are mounted is provided inside the apparatus case 3. The printed circuit board is disposed inside the electronic apparatus 100 so as to face the display panel 52.

Figure 12:
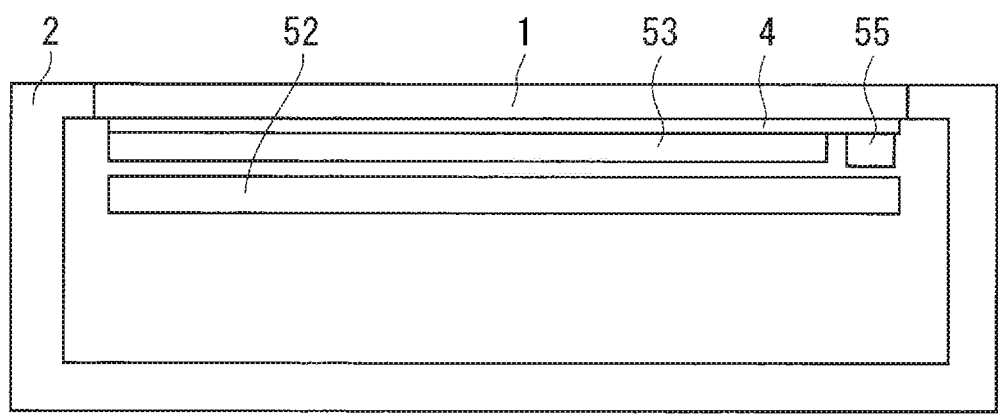
FIG. 12 illustrates a cross-sectional view of the electronic apparatus.
Figure 13:
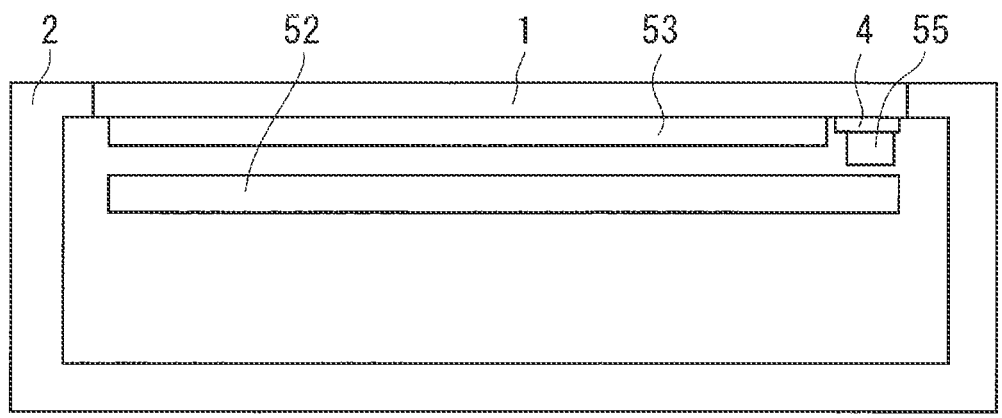
FIG. 13 illustrates a cross-sectional view of the electronic apparatus.

FIGS. 12 and 13 illustrate sectional structures of the electronic apparatus 100 according to one embodiment. In the examples of FIGS. 12 and 13, the piezoelectric vibrating element 55 is not directly disposed on the cover panel 1. The piezoelectric vibrating element 55 is disposed on a rear surface of a vibrating panel 4 different from the cover panel 1, the vibrating panel 4 being disposed on the rear surface of the cover panel 1. In other words, the piezoelectric vibrating element 55 is disposed on the cover panel 1 with the vibrating panel 4 therebetween. In this manner, a vibration unit is not limited to a cover panel.

The vibrating panel 4 comprises a transparent resin panel, a transparent resin film, a transparent glass panel, and a transparent glass film, for example. The vibrating panel 4 needs to sufficiently transmit a vibration generated by the piezoelectric vibrating element 55 to the cover panel 1. To enhance adhesion when the vibrating panel 4 and the piezoelectric vibrating element 55 are bonded to each other with an adhesive or a double-sided tape, a resin material is used for the vibrating panel 4 and is also preferably used for the piezoelectric vibrating element 55.

FIG. 12 illustrates an example of the vibrating panel 4 provided on an entire surface of the rear surface of the cover panel 1. FIG. 13 illustrates an example of the vibrating panel 4 provided on part of the rear surface of the cover panel 1 corresponding to the piezoelectric vibrating element 55. For the case of FIG. 12, a vibration of the vibrating panel 4 is transmitted to the entire surface of the cover panel 1, so that the user can hear the sound by moving any part of the cover panel 1 close to an ear. For the case of FIG. 13, the vibrating panel 4 provided on part of the rear surface of the cover panel 1 being the portion corresponding to the piezoelectric vibrating element 55 transmits a vibration to an area around the vibrating panel 4 in a concentrated manner, so that the user can sufficiently hear the sound by moving the vicinity of the piezoelectric vibrating element 55 close to an ear.

Figure 14:
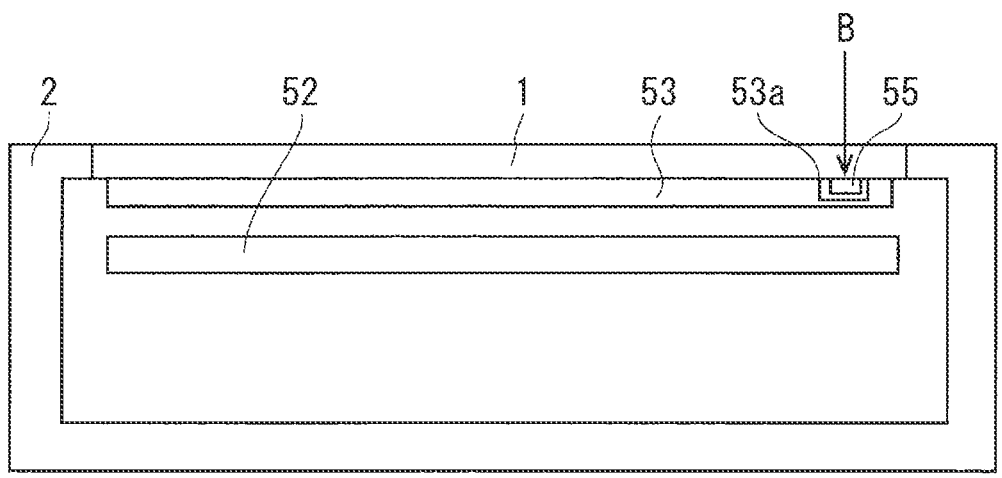
FIG. 14 illustrates a cross-sectional view of the electronic apparatus.

FIG. 14 illustrates a sectional structure of the electronic apparatus 100 according to one embodiment. FIG. 15 illustrates the touch panel 53 and the piezoelectric vibrating element 55 of the electronic apparatus 100 illustrated in FIG. 14 except for the cover panel 1 in a plan view when seen from a direction B. In the examples of FIGS. 14 and 15, the piezoelectric vibrating element 55 is located so as to be included inside the touch panel 53. Specifically, a recessed portion 53a is provided in a surface (main surface on the cover panel 1 side) of the touch panel 53, and the piezoelectric vibrating element 55 is disposed in the recessed portion 53a. The piezoelectric vibrating element 55 and the touch panel 53 are attached to the rear surface of the cover panel 1 with the adhesive or the double-sided tape.

For example, in a case where the finger of the user moves close to a portion immediately above the piezoelectric vibrating element 55 in the surface (outer main surface) of the cover panel 1 of the electronic apparatus 100 illustrated in FIG. 14, the controller 50 cannot detect position information of the finger of the user only by the recessed portion 53a when an area for detecting the proximity is not provided in the recessed portion 53a of the touch panel 53 including the piezoelectric vibrating element 55. However, the controller 50 can estimate the position information of the finger of the user based on information obtained from a peripheral portion of the recessed portion 53a in the touch panel 53.

It is described above that the area for detecting the proximity is not provided in the recessed portion 53a, but one embodiment is not limited thereto. For example, the piezoelectric vibrating element 55 itself may have the function of detecting a position.

Further, in the example of FIG. 14, the piezoelectric vibrating element 55 is surrounded by the recessed portion 53a in the touch panel 53. With this structure, a region in the cover panel 1 facing the recessed portion 53a is not attached to the touch panel 53, so that a sufficient vibrating region can be obtained. An area of the opening of the recessed portion 53a is sufficient as long as the vibrating region is great and a touch operation of the cover panel 1 above the piezoelectric vibrating element 55 can be sufficiently detected.

FIG. 14 illustrates the example of providing the recessed portion 53a in the touch panel 53 and disposing the piezoelectric vibrating element 55 in the recessed portion 53a, but one embodiment is not limited thereto. For example, if a vibration can be transmitted from the piezoelectric vibrating element 55 to the cover panel 1, the piezoelectric vibrating element 55 may be disposed inside the touch panel 53.

FIG. 16 illustrates an example of a display screen when an application regarding voice generation (application for generating a voice) is running. FIG. 16 illustrates the display screen at the start of a voice phone call after receiving an incoming call. An image 60 illustrated in FIG. 16 comprises an image notifying the user of a place where a sound is easily heard. The portion immediately above the piezoelectric vibrating element 55 makes the sound the easiest to be heard, and thus the image 60 is displayed in the position overlapping the piezoelectric vibrating element 55 in a plan view when seen from the cover panel 1 side.

In the example of FIG. 16, the application regarding the voice generation comprises the voice phone call, but one embodiment is not limited to this application and may generate a voice, for example, music reproduction and video reproduction.

<Earpiece Hole (Receiver Hole)>

An electronic apparatus such as a mobile phone may have an earpiece hole in the cover panel 1 being the front surface to take a sound to the outside of the electronic apparatus, the sound being output from a receiver (receiving speaker) provided inside the electronic apparatus.

In the electronic apparatus 100 according to one embodiment, the cover panel 1 outputting a sound does not have an earpiece hole (receiver hole). In other words, the earpiece hole is not provided in the surface of the electronic apparatus 100. This eliminates the need for a process of providing the earpiece hole in the cover panel 1. As a result, a manufacturing cost of the electronic apparatus 100 can be reduced, achieving a decrease in the cost of the electronic apparatus 100. Particularly in a case where the cover panel 1 is made of glass, sapphire, or the like, punching a hole in the cover panel 1 is difficult, so that the manufacturing cost of the electronic apparatus 100 can be further reduced by providing no earpiece hole in the cover panel 1. Further, the cover panel 1 without the earpiece hole can thus increase in strength. Moreover, the front surface of the cover panel 1 without the earpiece hole can have a higher degree of flexibility in designability. Particularly in the case where the cover panel 1 makes up most of the front surface of the electronic apparatus 100 similarly to one embodiment, providing no earpiece hole in the cover panel 1 is extremely effective in terms of designability. Further, the surface of the electronic apparatus 100 does not have the earpiece hole in one embodiment, thereby preventing problems in which water, dust, or the like enters the earpiece hole. This eliminates the need for a waterproof structure or a dustproof structure of the electronic apparatus 100 to solve the problems, and the cost of the electronic apparatus 100 can thus be further reduced.

In one embodiment, the vibration of the cover panel 1 generates a reception sound, so that the reception sound can be appropriately transmitted to the user without the earpiece hole in the electronic apparatus 100.

Further, a hole for exposing the operation button of the operation unit 54 is provided in the case portion 2 or no hole is provided for the operation button similarly to one embodiment, which eliminates holes in the cover panel 1. As a result, the cost of the electronic apparatus 100 can be further reduced, and the front surface of the cover panel 1 can have the higher degree of flexibility in designability.

The examples as described above comprise examples of applying embodiments of the present disclosure to mobile phones, and embodiments of the present disclosure are applicable to electronic apparatuses except for the mobile phones. For example, embodiments of the present disclosure are applicable to video games, notebook computers, portable navigation systems, or the like.

The examples as described above illustrate the mobile phone including the touch panel 53 as the electronic apparatus 100. One embodiments are not limited to this, and an electronic apparatus 100 allowing for inputs only by the hard key may receive an input while the touch panel 53 is not provided.

In the above description, the electronic apparatus 100 is described in detail, but the above description is the exemplification in all aspects and embodiments of the present disclosure are not intended to be limited thereto. In addition, various examples described above are applicable in combination as long as they are not mutually inconsistent. And, it is construed that numerous modifications which are not exemplified can be envisaged without departing from the scope of the present disclosure.

The invention claimed is:

1. An electronic apparatus, comprising:
an exterior exposed to the outside, said exterior including a cover panel;
a piezoelectric vibrating element being transparent and being located inside said exterior;
a vibration unit being transparent and including a surface on which said piezoelectric vibrating element is located, said vibration unit being configured to vibrate by said piezoelectric vibrating element to generate a voice; and
a display located inside said exterior and overlapping said piezoelectric vibrating element in a plan view;
wherein said piezoelectric vibrating element is located between said cover panel and said display, an outline of said piezoelectric vibrating element is smaller than an outline of said display in a plan view and said cover panel serves as said vibration unit.

2. The electronic apparatus according to claim 1, wherein said piezoelectric vibrating element comprises a piezoelectric material made of resin.

3. The electronic apparatus according to claim 1, wherein said vibration unit is exposed to the outside and transmits an image or video from said display.

4. The electronic apparatus according to claim 1, wherein said vibration unit generates air conduction sound and vibrating sound transmitted by vibrating part of a human body.

5. The electronic apparatus according to claim 1, further comprising an approach detecting unit located so as to overlap said piezoelectric vibrating element in a plan view.

6. The electronic apparatus according to claim 5, wherein said piezoelectric vibrating element is located so as to be included inside said approach detecting unit.

7. The electronic apparatus according to claim 1, wherein said display displays an image notifying where sound is easily heard when an application for generating a voice is running, and
said image is displayed in a position overlapping said piezoelectric vibrating element in a plan view.

8. An electronic apparatus, comprising:
an exterior exposed to the outside;
a piezoelectric vibrating element being transparent and being located inside said exterior;
a vibration unit being transparent and including a surface on which said piezoelectric vibrating element is located, said vibration unit being configured to vibrate by said piezoelectric vibrating element to generate a voice; and
a display located inside said exterior and overlapping said piezoelectric vibrating element in a plan view,
wherein an outline of said piezoelectric vibrating element is smaller than an outline of said display in a plan view, and said vibration unit is exposed to the outside.

9. The electronic apparatus according to claim 8, wherein said piezoelectric vibrating element is located on a peripheral end portion of said display in a plan view.

* * * * *